UNITED STATES PATENT OFFICE.

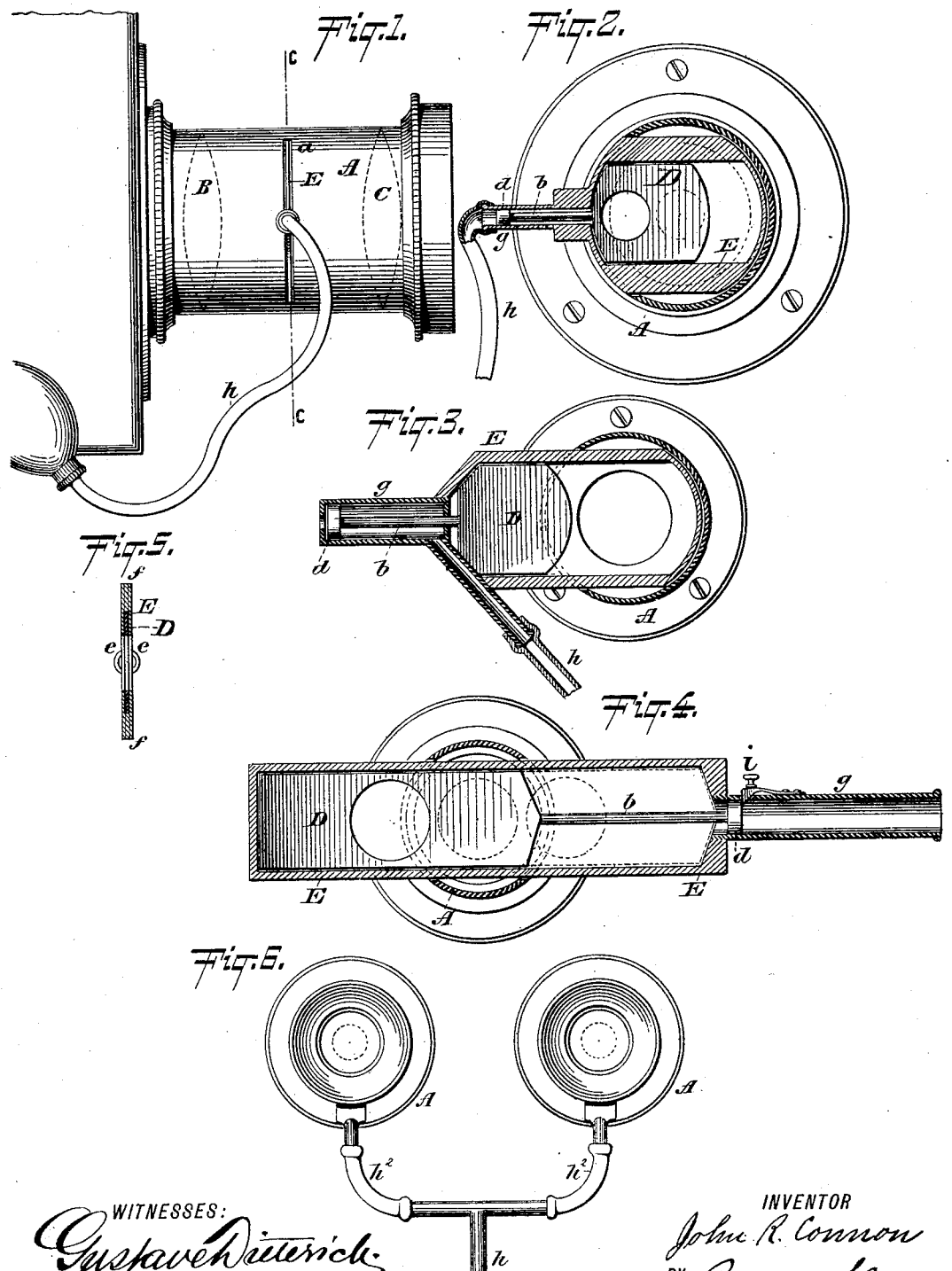

JOHN R. CONNON, OF ELORA, CANADA, ASSIGNOR TO GUSTAV GENNERT AND MORRIS GENNERT, OF GREENVILLE, NEW JERSEY.

SLIDE-SHUTTER FOR PHOTOGRAPHIC CAMERAS.

SPECIFICATION forming part of Letters Patent No. 451,027, dated April 28, 1891.

Application filed June 13, 1890. Serial No. 355,296. (No model.)

*To all whom it may concern:*

Be it known that I, JOHN R. CONNON, a resident of Elora, county of Wellington, Province of Ontario, Canada, have invented an Improved Slide-Shutter for Photographic Cameras, of which the following is a specification, reference being had to the accompanying drawings, forming a part thereof, wherein—

Figure 1 represents a side view of the lens-tube of a camera, showing it adapted to receive my improved shutter and showing the shutter in place. Fig. 2 is a cross-section on the line $c\ c$, Fig. 1. Fig. 3 is a similar cross-section of a modification of the invention, and Fig. 4 is a similar cross-section of still another modification. Fig. 5 is a detail cross-section of the shutter and of the hollow shell within or on which it is placed. Fig. 6 is an end view of a stereoscopic camera, showing my invention applied thereto.

This invention relates to a new pneumatic shutter for use in photographic cameras; and it consists, mainly, in the combination of a sliding shutter with a perforated narrow casing or diaphragm, said shutter carrying a plunger, which is combined with means for moving it by direct pneumatic pressure, as hereinafter more fully described.

The invention also consists in further details of improvement that are hereinafter more clearly pointed out.

In the drawings, the letter A represents the lens-tube of a photographic camera, the same having the usual two lenses B and C, which are indicated by dotted lines in Fig. 1. Between the two lenses the tube A has a slit $a$, into which the thin diaphragm or shell carrying my shutter can be inserted to take the place of a central stop.

The shutter-body D is a thin piece of sheet metal, by preference, or of analogous substance, and carries on a rod $b$ a plunger $d$. The blade D of the shutter is contained between two sheet-metal plates $e\ e$, which are at their edges united, as at $f\ f$, into a hollow shell or casing, within which the shutter-body D is capable of longitudinal motion. The shell, composed of the face-pieces $e\ e$ and of the edge connections $f$, is marked E in the drawings, and is, as the drawings show, a narrow hollow shell capable of being inserted into the slit $a$ of the tube A; but of course my improved device can be used on a shell E having but one perforated face, and in other places than in the lens-tube A and otherwise than between the two lenses B and C. The shell E has a projecting tube $g$, into which the plunger $d$ of the shutter enters, and this projecting tube $g$ at its end is finally connected with a flexible or other tube $h$, which connects with a compression-bulb, so that by forcing air through the tube $h$ the plunger $d$ will be advanced in the tube $g$, and the shutter thereby pushed forward in the shell E.

As in Fig. 2, the shutter may have an aperture which comes into alignment with a corresponding aperture in the shell when the shutter is pushed forward; or, as in Fig. 3, the shutter may be without an aperture, being adapted only to close the aperture of the shell E.

For very rapid action the shutter may be constructed as in Fig. 4—that is to say, of such a length as to the length of the shell that in its advance motion the aperture of the shutter will fly past the aperture of the shell E, after which the shutter will be held fast by a suitable spring-catch $i$.

The modification shown in Fig. 3, in which the shutter is solid, is best used with the air-supply pipe $h$, connected to the tube $g$ in front of the plunger $d$, so that when air is compressed in pipe $h$ the shutter will be brought into the position shown in Fig. 3, and when air is afterward exhausted by enlarging the bulb the shutter will fly forward to close the aperture in the shell E.

The construction shown in Fig. 2 causes the shutter to fly forward when air is compressed and to hold its aperture in alignment with the aperture of the shell E as long as the operator desires. The instant the operator releases his pressure on the bulb and causes expansion of the air the shutter will fly back to the position shown in Fig. 2, and thereby close the aperture of the shell.

Fig. 6 shows that my invention can be applied to a camera intending to take stereoscopic pictures or to open and close simultaneously any two or more lenses, when both shutters will be made to move simultaneously if connected by branch tubes $h^2$ $h^2$ with the air-tube $h$.

A special advantage of the arrangement shown in Fig. 1 is that the shutter and its shell constitute a central stop between the lenses, allowing the exposure to be either instantaneous or of such duration as the operator may desire.

Of course series of shells E and shutters for the same having different sizes of apertures may be used in connection with the same camera.

What I claim, and desire to secure by Letters Patent, is—

1. In a photographic camera, the combination of the lens-tube A, having slit $a$, and lenses B C, with the hollow removable shell E, carrying the pneumatic shutter D, said shell being adapted to be inserted through said slit $a$ to constitute a central stop, as set forth.

2. The shell E, having perforated face and projecting tube $g$, combined with the sliding shutter D, carried by said shell, said shutter having the rod $b$ and piston $d$, and with the air compression and expansion tube $h$, which is applied to the tube $g$, substantially as herein shown and described.

JOHN R. CONNON.

Witnesses:
HARRY M. TURK,
JOHN M. SPEER.